US012291971B1

(12) United States Patent
Gomez et al.

(10) Patent No.: US 12,291,971 B1
(45) Date of Patent: May 6, 2025

(54) BLADE OUTER AIR SEAL WITH GRADED COATING

(71) Applicant: RTX CORPORATION, Farmington, CT (US)

(72) Inventors: Juan Gomez, El Paso, TX (US); Nizar Zahed, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/440,550

(22) Filed: Feb. 13, 2024

(51) Int. Cl.
*F01D 11/12* (2006.01)

(52) U.S. Cl.
CPC ........ *F01D 11/122* (2013.01); *F05D 2220/32* (2013.01); *F05D 2230/31* (2013.01); *F05D 2240/55* (2013.01)

(58) Field of Classification Search
CPC ............... F01D 11/122; F05D 2220/32; F05D 2230/31; F05D 2240/55
See application file for complete search history.

(56) References Cited

U.S. PATENT DOCUMENTS

| | | | | |
|---|---|---|---|---|
| 6,358,002 | B1 * | 3/2002 | Good | F01D 11/122 415/174.4 |
| 10,145,252 | B2 * | 12/2018 | Kirby | F01D 9/04 |
| 10,858,950 | B2 * | 12/2020 | Shi | F01D 11/14 |
| 10,870,152 | B2 | 12/2020 | Le Biez et al. | |
| 10,900,371 | B2 * | 1/2021 | Shi | F01D 11/122 |
| 11,174,749 | B2 | 11/2021 | Le Biez et al. | |
| 11,248,484 | B2 | 2/2022 | Schlothauer et al. | |
| 11,313,243 | B2 * | 4/2022 | Shi | F01D 11/122 |
| 11,976,569 | B2 * | 5/2024 | Shuck | B22F 7/08 |
| 2011/0103940 | A1 * | 5/2011 | Duval | F01D 11/125 156/280 |
| 2011/0182720 | A1 * | 7/2011 | Kojima | F01D 11/122 415/173.4 |
| 2015/0354393 | A1 * | 12/2015 | Lipkin | F01D 11/122 427/552 |
| 2021/0221749 | A1 * | 7/2021 | Golden | C04B 41/4533 |
| 2022/0002857 | A1 | 1/2022 | Li et al. | |

* cited by examiner

*Primary Examiner* — Jesse S Bogue

(74) *Attorney, Agent, or Firm* — Carlson, Gaskey & Olds, P.C.

(57) ABSTRACT

A blade outer air includes a center web having a radially inner face and a radially outer face, at least one mounting arm extending from the radially outer face, and a graded coating disposed on the radially inner face. The graded coating has an abradable component in a first region and a protective component in a second region. The abradable component has a higher porosity than the protective component. A gas turbine engine and a method of protecting a blade outer air seal are also disclosed.

12 Claims, 3 Drawing Sheets

BLADE OUTER AIR SEAL WITH GRADED COATING

BACKGROUND OF THE INVENTION

This application relates to the use of coatings on a blade outer air seal.

Gas turbine engines typically include a fan delivering air into a bypass duct as propulsion air, and into a core engine. The core engine air moves into a compressor section where it is compressed and delivered into a combustor. The air is mixed with fuel and ignited in the combustor and passed downstream over turbine rotors driving them to rotate. The turbine rotors in turn rotate the fan and compressor rotors.

Improving the efficiency of gas turbine engines is important. To maximize the energy extraction from the volume of the products of combustion passing through the turbine rotors, a blade outer air seal ("BOAS") is placed radially outwardly of turbine blades to minimize blade tip clearance and block the flow of products of combustion from avoiding the turbine blades.

There is a need for BOAS coating with improved temperature and environmental resistance and improved rub performance for use in the operating conditions in a gas turbine engine.

SUMMARY OF THE INVENTION

A blade outer air seal according to an exemplary embodiment of this disclosure, among other possible things includes a center web having a radially inner face and a radially outer face, at least one mounting arm extending from the radially outer face, and a graded coating disposed on the radially inner face. The graded coating has an abradable component in a first region and a protective component in a second region. The abradable component has a higher porosity than the protective component.

In a further example of the foregoing, the porosity of the abradable component is between about 20% and about 60%.

In a further example of any of the foregoing, the porosity of the protective component is between about 5% and about 20%.

In a further example of any of the foregoing, a porosity of the abradable component is graded in a direction of its thickness.

In a further example of any of the foregoing, the abradable component comprises at least one of rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof.

In a further example of any of the foregoing, the protective component comprises at least one of an environmental barrier coating and a thermal barrier coating.

In a further example of any of the foregoing, the first region has a first thickness and the second region has a second thickness, and the second thickness is greater than the first thickness.

In a further example of any of the foregoing, the second region includes at least first and second subregions.

In a further example of any of the foregoing, the first subregion is at a leading edge of the blade outer air seal and the second subregion is at a trailing edge of the blade outer air seal.

In a further example of any of the foregoing, the first region includes a layer of the abradable component and a layer of the protective component.

A gas turbine engine according to an exemplary embodiment of this disclosure, among other possible things includes a turbine section arranged along a central engine axis. The turbine section has a turbine with at least one blade rotatable around the central engine axis. The at least one blade has a tip. The gas turbine engine also includes at least one blade outer air seal arranged radially outward from the tip and attached to an engine static structure. The blade outer air seal includes a center web having a radially inner face and a radially outer face, at least one mounting arm extending from the radially outer face, and a graded coating disposed on the radially inner face. The graded coating has an abradable component in a first region with a protective component in a second region. The abradable component has a higher porosity that the protective component.

In a further example of the foregoing, the porosity of the abradable component is between about 20% and about 60%.

In a further example of any of the foregoing, the porosity of the protective component is between about 5% and about 20%.

In a further example of any of the foregoing, a porosity of the abradable component is graded in a direction of its thickness.

In a further example of any of the foregoing, the first region has a first thickness and the second region has a second thickness, and the second thickness is greater than the first thickness.

In a further example of any of the foregoing, the second region includes at least first and second subregions.

In a further example of any of the foregoing, the first subregion is at a leading edge of the blade outer air seal and the second subregion is at a trailing edge of the blade outer air seal.

In a further example of any of the foregoing, the first region includes a layer of the abradable component and a layer of the protective component.

A method of protecting a blade outer air seal according to an exemplary embodiment of this disclosure, among other possible things includes, on a radially inner face of a blade outer air seal, applying a graded coating. The graded coating has an abradable component in a first region and a protective component in a second region. The abradable component has a higher porosity that the protective component.

In a further example of the foregoing, the method includes masking one of the first and second regions during the step of applying the graded coating to the other of the first and the second regions.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
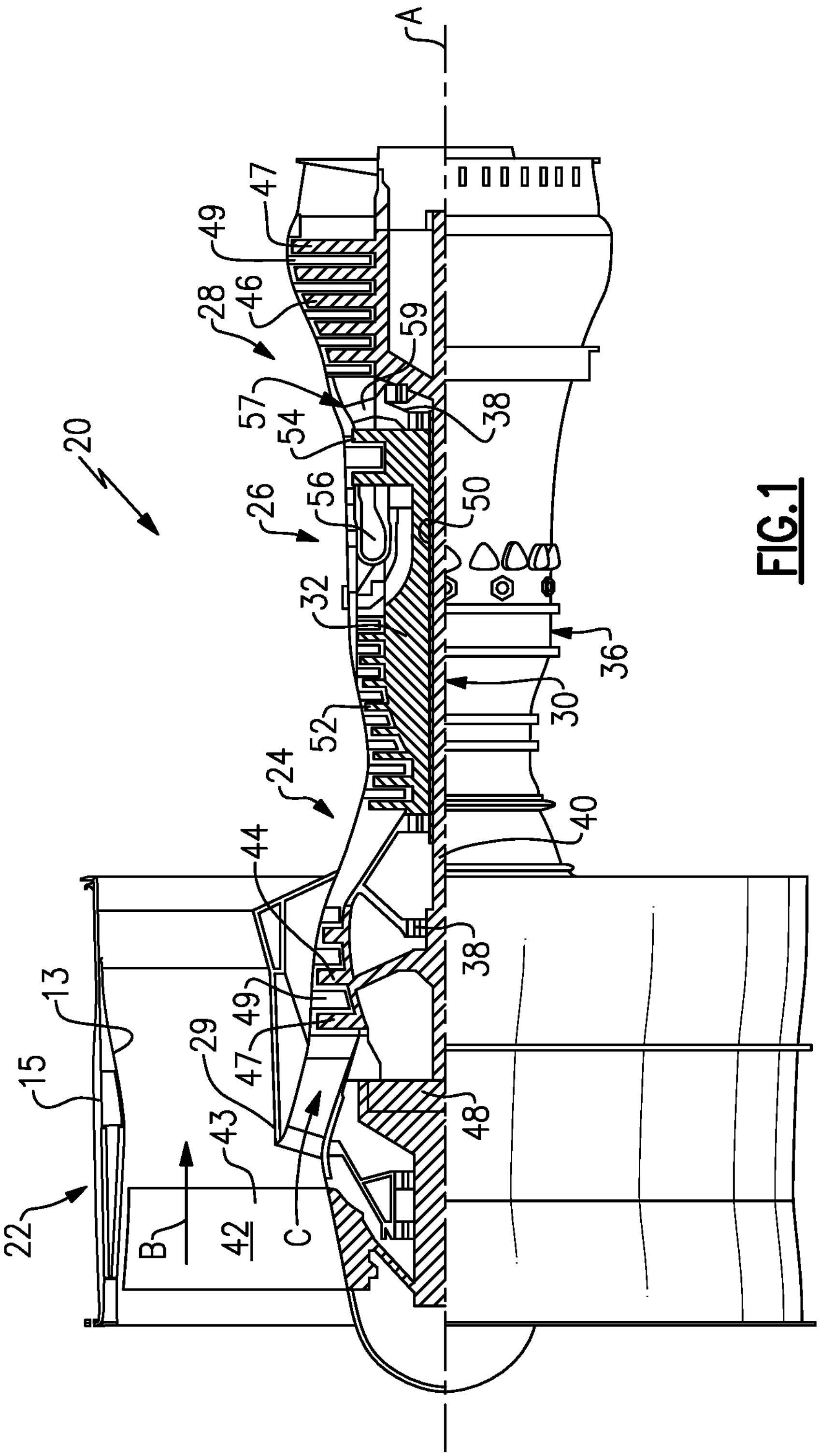
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram}\ ^\circ \text{R})/(518.7^\circ \text{R})]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2:
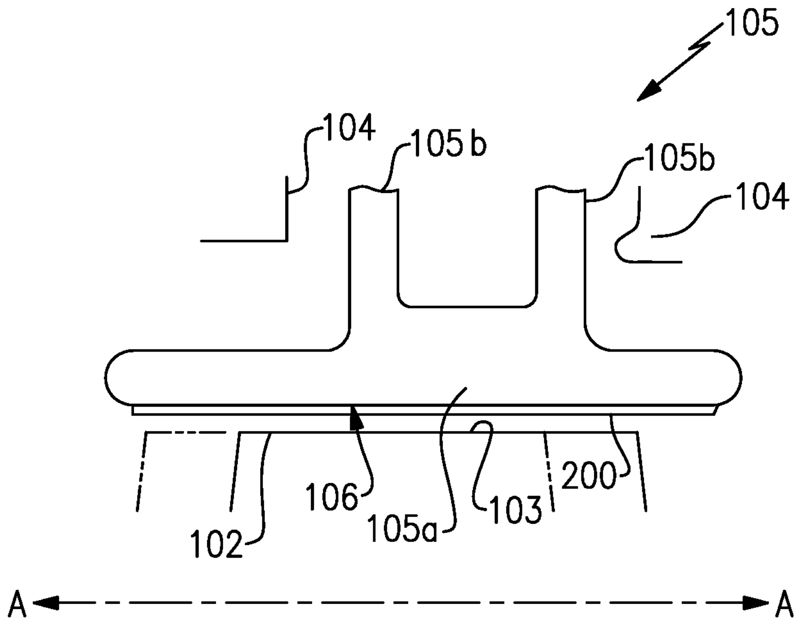
FIG. 2 shows a turbine section of the gas turbine engine of FIG. 1.

FIG. 2 shows a turbine section 28 having rotating turbine blades 102 with a radially outer tip 103. A vane is positioned upstream of the turbine blade 102. In one example the turbine blade 102 is a blade of the high pressure turbine 54 (FIG. 1). A blade outer air seal (BOAS) 105 is positioned radially outwardly of the tip 103 with respect to a central engine axis. A plurality of BOAS (not shown) are arranged circumferentially round the central engine axis. The BOAS 105 has a center web **105*a* and mounting arms 105*b* extending from the center web for mounting the BOAS to the engine 20 static structure 104. The center web 105*a* has a radially inner face 106 (where "radially inner" is in reference to the central engine axis A) and a radially outer face from which the mounting arms 105*b*** extend.

In one example, the BOAS 105 is formed out of ceramic matrix composite materials ("CMCs") or a monolithic ceramic. A CMC material is comprised of one or more ceramic reinforcement plies in a ceramic matrix. Example ceramic matrices are silicon-containing ceramic, such as but not limited to, a silicon carbide (SiC) matrix or a silicon nitride ($Si_3N_4$) matrix. Example ceramic reinforcement of the CMC are silicon-containing ceramic fibers, such as but not limited to, silicon carbide (SiC) fiber or silicon nitride ($Si_3N_4$) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. A monolithic ceramic does not contain fibers or reinforcements and is formed of a single material. Example monolithic ceramics include silicon-containing ceramics, such as silicon carbide (SiC) or silicon nitride ($Si_3N_4$).

The radially inner face 106 may sometimes rub against the blade 102 tip 103 while the engine 20 is operating. Accordingly, many BOAS 105 include an abradable coating 200 on the radially inner face 106 to accommodate the rubbing. In some examples the tip 103 includes an abrasive coating that couples with the abradable coating on the BOAS 105.

Usually, the entire radially inner face 106 of the BOAS includes this abradable coating. In a single-coating system, where the abradable coating is the only coating, other coatings that may provide environmental protection or temperature resistance to the BOAS, 105 are not used at the radially inner face 106. The abradable coatings are high-porosity coatings that may provide a measure of environmental and/or temperature protection, but not to the extent of dense environmental barrier coatings or thermal barrier coatings.

Figure 3:
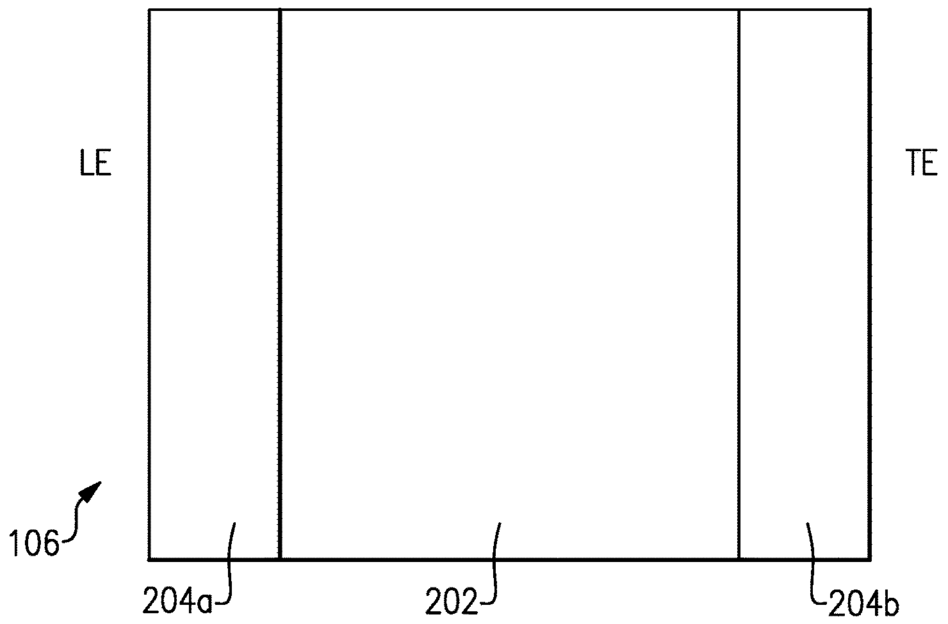
FIG. 3 schematically illustrates a radially inner face of a blade outer air seal in the turbine section of FIG. 2.

However, only discrete areas of the radially inner face 106 that are positioned radially outward from the blade 102 tips 103 benefit from the abradable coating applied thereon. To that end, as best shown in FIG. 3, the radially inner face 106 of the BOAS 105 includes a graded coating 200. The coating 200 is graded in that it has varying porosity in a lateral direction (e.g., the direction perpendicular to its thickness, which is discussed in more detail below). More specifically, the graded coating 200 includes at least two regions, the first region 202 having a higher porosity abradable component and the second region 204 having a lower porosity protective component, such as any known coating that provides environmental or temperature resistance, or both, to the BOAS 105. In one example, the porosity of the abradable component in first region 202 is between about 20% and about 60% while the porosity of the protective component is below about 30%, or in a more particular example, between about 5 and about 20%.

In some examples, the higher porosity abradable component may additionally have a graded porosity in the direction of its thickness. More specifically, the porosity of the abradable component is highest at the outermost surface of the coating and decreases approaching the interface of the coating 200 with the radially inner face 106 of the BOAS 105. The higher porosity at the outermost surface of the coating 200 better accommodates tip 103 rub while the lower porosity near the interface provides improved protection to the BOAS 105. The higher porosity at the outermost surface can be up to about 60 percent in some examples. Still, in this example, an average porosity of the abradable component is higher than the porosity of the protective component.

The abradable coating in the first region 202 may be or include, for example, rare earth silicates, alkaline earth silicates, alkaline earth aluminosilicates, yttria-stabilized zirconia, alumina-stabilized zirconia, mullite, titania, chromia, silicon, silicon oxides, silicon carbides, silicon oxycarbides, barium-magnesium aluminosilicate, hafnium oxides such as hafnon, hafnium silicon oxides, alumina-stabilized zirconia, zirconium oxides such as zircon, yttrium oxides such as yttria, mullite, and combinations thereof. In a particular example, the abradable coating 200 includes at least one of hafnon, zircon, and mullite.

The protective component in the second region 204 can be any known environmental barrier coating or thermal barrier coating.

In a particular example the second region 204 includes two subregions 204*a*/204*b* at the leading and trailing edges (LE and TE, respectively) of the BOAS 105 whereas the first region 202 is in the central portion of the radially inner face 106 of the BOAS 105.

Figure 4:
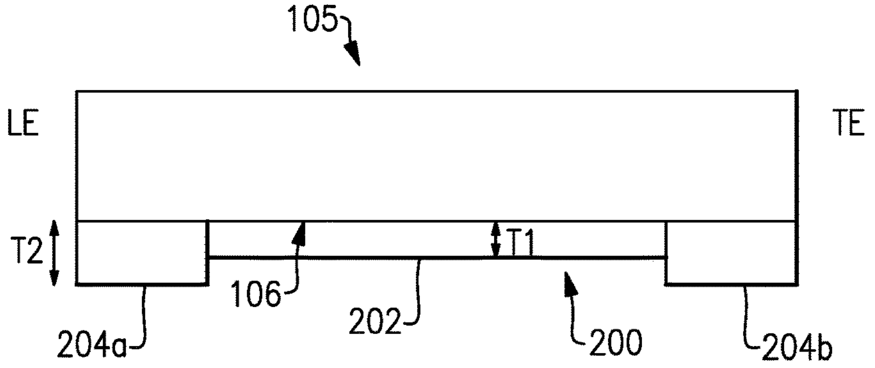
FIG. 4 schematically illustrates a cross-sectional view of the BOAS in FIGS. 2-3.

FIG. 4 shows a cross-sectional area of the BOAS. As shown in FIG. 4, in some examples the first region 202 has a thickness T1 while the second region 204 (including sub-regions 204*a*/204*b*, where used) has thickness T2. The thickness T2 is greater than the thickness T1. This allows for improved sealing even if the abradable coating in the first region 202 is worn down due to rubbing with the tip 103. In a particular example, a ratio of the thickness T1 to the thickness T2 is between about 0.3 at maximum rub conditions.

In other examples, the first region 202 and second region 204 can have uniform thickness when the coating 200 is applied to the BOAS 105. In other examples, T1 is greater than T2 when the coating 200 is applied to the BOAS 105.

The graded coating 200 provides additional environmental and thermal protection to the BOAS 105 as compared to a BOAS that has an abradable coating disposed along its entire radially inner face 106. In particular, the environmental barrier coating and/or thermal barrier coating in the second region 204 provides improved temperature and environmental resistance to the BOAS 105 while the first region 202 accommodates potential rubbing from the tip 103 of the blade 102.

The graded coating 200 can be applied to the radially outer face 106 by any suitable method for the particular materials selected as is known in the art, such as spray techniques. In one example, the coating 200 is applied region-by-region. In a more particular example, masking techniques as are known in the art may be employed to contain the coating 200 in the desired region. For instance, the first region 202 may be masked while the coating 200 is applied to the second region and the second region 204 may be masked while the coating 200 is applied to the first region. Post-application processing techniques can then be performed, such as to smooth the surface of the abradable component.

Figure 5:
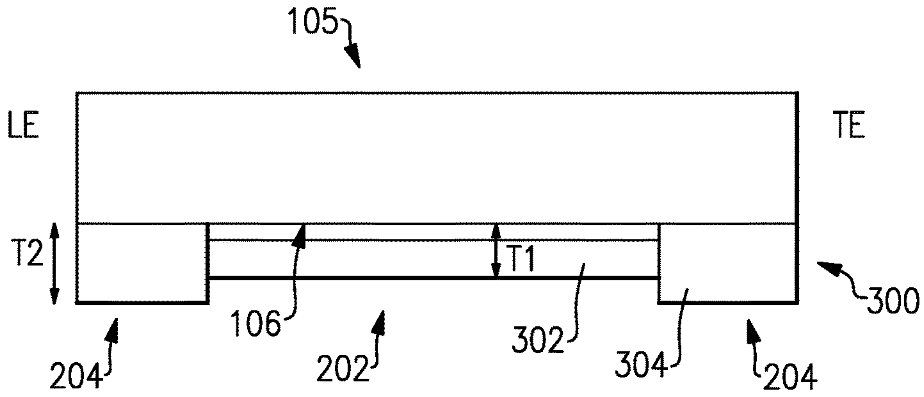
FIG. 5 schematically illustrates a cross-sectional view of a BOAS with an alternative coating.

FIG. 5 shows another example graded coating 300 at the radially inner face 106 of the BOAS 105. In this example, the first region 202 includes a multi-layer coating having a higher porosity abradable component 302 at the outermost face and a lower porosity protective component 304 such as a thermal barrier coating and/or an environmental barrier coating as discussed above at the interface between the coating and the radially outer face 106. The protective component 304 continues to the second region 204 and/or subregions 204*a*/204*b*, if present. The porosity of the abradable component 302 may in some examples be graded in a direction of this thickness as discussed above for the coating 200. A total coating thickness T1 in the first region 202 and total coating thickness T2 in the second region may also be selected as discussed above for the coating 200, in some examples.

The graded coating 300 can be applied to the radially outer face 106 by any suitable method for the particular materials selected as is known in the art, such as spray techniques. In one example, the protective component 304 is applied first over the entire radially inner surface 106 and to the thickness T2. A portion of the protective component 304 is then machined away in the first region 202 by any suitable method. The protective component 304 is masked in the second region 204 by any known masking technique. The abradable component 302 is applied in the first region 302 to provide a total thickness T1 in the first region. As for the coating 200, post-application processing may then be performed such as to smooth the surface of the abradable component.

As used herein, the term "about" and "approximately" have the typical meanings in the art, however in a particular example "about" and "approximately" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A blade outer air seal, comprising:
- a center web having a radially inner face and a radially outer face;
- at least one mounting arm extending from the radially outer face;
- a graded coating disposed on the radially inner face, the graded coating being graded by having an abradable component in a first region and a protective component in a second region, and wherein the abradable component has a higher porosity than the protective component;
- the porosity of the abradable component is between 20% and 60%;
- wherein the porosity of the protective component is between 5% and 20%; and
- wherein the second region includes a first subregion and a second subregion, the first region is between the first and second subregions, and wherein the first region has a first thickness and the first and second subregions each have a second thickness that is greater than the first thickness such that a recess is provided over the first region between the first and second subregions, and the protective component is single-layered.

2. The blade outer air seal as recited in claim 1, wherein the abradable component comprises at least one of alkaline earth silicates, alkaline earth aluminosilicates, alumina-stabilized zirconia, titania, chromia, silicon oxides, silicon oxycarbides, barium-magnesium aluminosilicate, and combinations thereof.

3. The blade outer air seal as recited in claim 2, wherein the abradable component comprises at least one of alkaline earth silicates, alkaline earth aluminosilicates, and alumina-stabilized zirconia.

4. The blade outer air seal as recited in claim 2, wherein the abradable component comprises at least one of titania and chromia.

5. The blade outer air seal as recited in claim 2, wherein the abradable component comprises at least one of silicon oxides, silicon oxycarbides, and barium-magnesium aluminosilicate.

6. The blade outer air seal as recited in claim 1, wherein the protective component is an environmental barrier coating or a thermal barrier coating.

7. A gas turbine engine, comprising:
- a turbine section arranged along a central engine axis, the turbine section having a turbine with at least one blade rotatable around the central engine axis, the at least one blade having a tip; and
- at least one blade outer air seal arranged radially outward from the tip and attached to an engine static structure, the blade outer air seal including:
  - a center web having a radially inner face and a radially outer face;
    - at least one mounting arm extending from the radially outer face;
    - a graded coating disposed on the radially inner face, the graded coating being graded by having an abradable component in a first region with a protective component in a second region, wherein the abradable component has a higher porosity that the protective component;
  - the porosity of the abradable component is between 20% and 60%;
  - wherein the porosity of the protective component is between 5% and 20%; and
  - wherein the second region includes a first subregion and a second subregion, the first region is between the first and second subregions, and wherein the first region has a first thickness and the first and second subregions each have a second thickness that is greater than the first thickness such that a recess is provided over the first region between the first and second subregions, and the protective component is single-layered.

8. The gas turbine engine as recited in claim 7, wherein the abradable component comprises at least one of alkaline earth silicates, alkaline earth aluminosilicates, alumina-stabilized zirconia, titania, chromia, silicon oxides, silicon oxycarbides, barium-magnesium aluminosilicate, and combinations thereof.

9. The gas turbine engine as recited in claim 8, wherein the abradable component comprises at least one of alkaline earth silicates, alkaline earth aluminosilicates, and alumina-stabilized zirconia.

10. The gas turbine engine as recited in claim 8, wherein the abradable component comprises at least one of titania and chromia.

11. The gas turbine engine as recited in claim 8, wherein the abradable component comprises at least one of silicon oxides, silicon oxycarbides, and barium-magnesium aluminosilicate.

12. The gas turbine engine as recited in claim 7, wherein the protective component is an environmental barrier coating or a thermal barrier coating.

* * * * *